(12) United States Patent
Labio et al.

(10) Patent No.: US 8,412,575 B2
(45) Date of Patent: Apr. 2, 2013

(54) DETERMINING AND/OR MANAGING OFFERS SUCH AS BIDS FOR ADVERTISING

(75) Inventors: Wilburt Labio, Cupertino, CA (US);
Sridhar Ramaswamy, Cupertino, CA (US); Mark Rose, Los Altos, CA (US)

(73) Assignee: Google Inc., Mountain View, CA (US)

( * ) Notice: Subject to any disclaimer, the term of this patent is extended or adjusted under 35 U.S.C. 154(b) by 2313 days.

(21) Appl. No.: 11/172,614

(22) Filed: Jun. 30, 2005

(65) Prior Publication Data

US 2007/0005421 A1    Jan. 4, 2007

(51) Int. Cl.
*G06Q 30/00* (2012.01)
(52) U.S. Cl. ............... 705/14.49; 705/14.48; 705/14.52
(58) Field of Classification Search ........... 705/1–28
See application file for complete search history.

(56) References Cited

U.S. PATENT DOCUMENTS

| | | |
|---|---|---|
| 2003/0135460 A1 | 7/2003 | Talegon |
| 2003/0153329 A1* | 8/2003 | Stefan et al. ............... 455/456 |
| 2004/0059655 A1* | 3/2004 | Seifert et al. ............... 705/35 |
| 2004/0107137 A1 | 6/2004 | Skinner |
| 2005/0065844 A1* | 3/2005 | Raj et al. ............... 705/14 |

OTHER PUBLICATIONS

PCT/ISA/220, "Notification of Transmittal of the International Search Report and the Written Opinion of the International Searching Authority, or the Declaration" for PCT/US06/24149 mailed Aug. 27, 2007 (1 pg.).
PCT/ISA/210, "International Search Report" for PCT/US06/24149, mailed Aug. 27, 2007 (2 pgs.).
PCT/ISA/237, "Written Opinion of the International Searching Authority" for PCT/US06/24149, mailed Aug. 27, 2007 (5 pgs.).

* cited by examiner

*Primary Examiner* — Scott D Gartland
(74) *Attorney, Agent, or Firm* — John C. Pokotylo; Straub & Pokotylo

(57) ABSTRACT

Offers, such as bids in an advertising network, may be determined and/or managed by accepting an ad budget and at least one ad serving constraint, and then generating offer information using the ad budget and the serving constraint(s). The offer may be generated by obtaining, for each of the ad serving constraint(s), a plurality of points, wherein each point includes a cost per event value and an event quantity value. These points collectively define a landscape. A convex landscape for each of the ad serving constraint(s) is then determined from the landscape(s). One or more points from at least one of the convex landscapes is then used to generate the offer information.

25 Claims, 9 Drawing Sheets

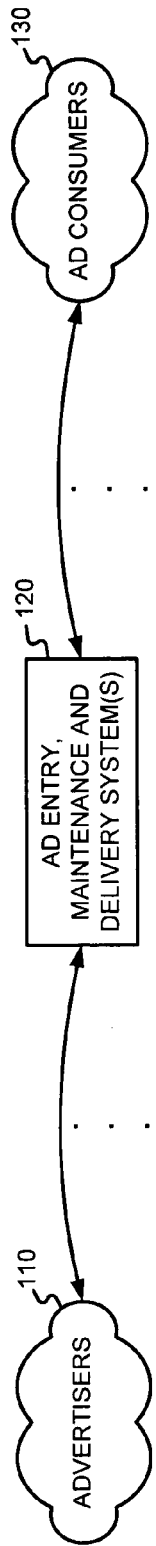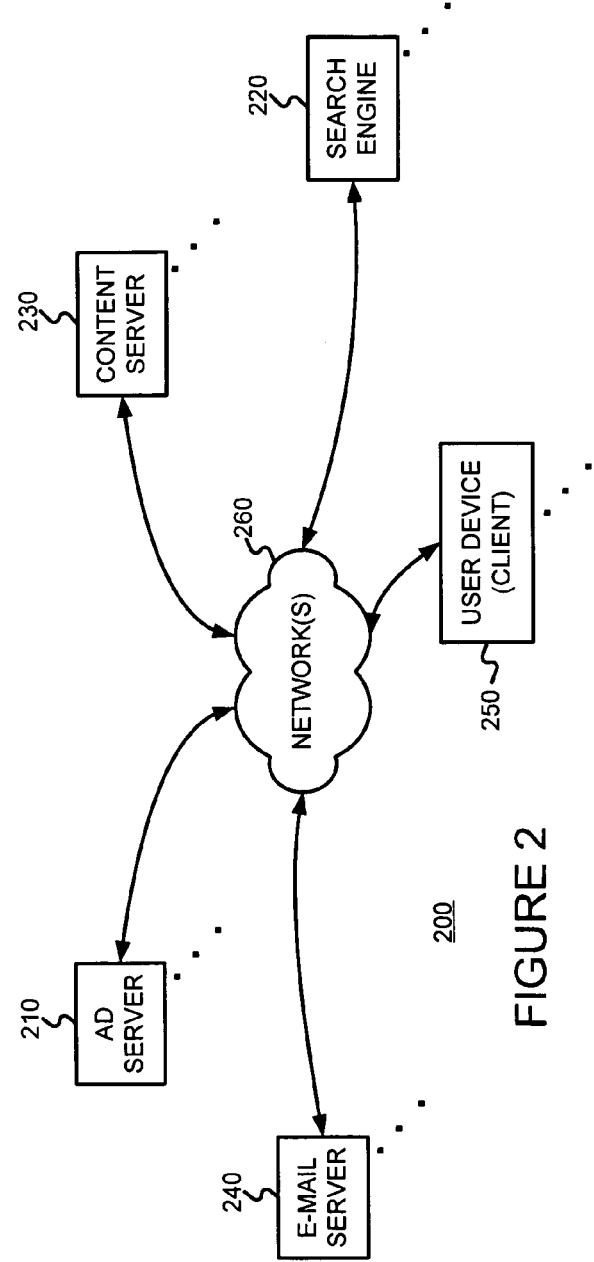

1000

1100

DETERMINING AND/OR MANAGING OFFERS SUCH AS BIDS FOR ADVERTISING

§1. BACKGROUND OF THE INVENTION

§1.1 Field of the Invention

The present invention concerns advertising. In particular, the present invention concerns helping advertisers to manage advertising campaigns such as online advertising campaigns for example.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.) Query keyword targeting has been used by search engines to deliver relevant ads. For example, the AdWords advertising system by Google of Mountain View, Calif., delivers ads targeted to keywords from search queries. Similarly, content targeted ad delivery systems have been proposed. For example, U.S. patent application Ser. Nos. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and 10/375,900 (incorporated by reference and referred to as "the '900 application") titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

Regardless of whether or how ads are targeted, an advertiser typically compensates the content (e.g., Web page) owner (and perhaps an ad serving entity). Such compensation may occur whenever the ad is served (per impression), or may be subject to a condition precedent such as a selection, a conversion, etc. Compensation per selection (commonly referred to as "pay per click") is currently becoming popular. Compensation may be determined from an offer (e.g., maximum offer, bid, etc.) associated with a targeting keyword and/or some other targeting criteria.

There are some advertisers that do not want to deal with bids, or at least not on an ongoing (e.g., daily) basis. For example, in the current AdWords system, the advertiser may need to specify numerous parameters to initiate an ad campaign or ad group. Such parameters may include, among other items, budget, keywords that the campaign is targeted to, serving constraints (also referred to as "targeting criteria") such as the country, region, city or language to target, and a maximum offer per selection for each keyword. Unfortunately, specifying the appropriate parameters can be time-consuming. It is especially time consuming to specify and manage offers because this can be an on-going process. That is, at least for parameters such as budget, targeting keywords and audience constraints, most of the work is done at setup time, or during some periodic "optimization" or tuning of the targeting. Offers, on the other hand, are often adjusted on an ongoing basis, both because the number of possible bid combinations makes finding an optimal solution a trial-and-error process, and because of the dynamic nature of the AdWords auction.

Thus, it would be useful to manage keyword offers (e.g., bids), or offers associated with any serving constraint(s), on behalf of advertisers.

§2. SUMMARY OF THE INVENTION

Embodiments consistent with the present invention may be used to help advertisers to maximize the amount of traffic (e.g., in terms of the number of selections, the number of impressions, the number of conversions, etc.) an advertiser receives (e.g., for serving constraints, such as one or more given keywords for example) under a specified budget.

For example, at least one embodiment consistent with the present invention may determine and/or manage offers, such as bids in an advertising network, by accepting an ad budget and at least one ad serving constraint, and then generate offer information using the ad budget and the serving constraint(s). The offer may be generated by obtaining, for each of the ad serving constraint(s), a plurality of points, wherein each point includes a cost per event value and an event quantity value. These points collectively define a landscape. A convex landscape for each of the ad serving constraint(s) is then determined from the landscape(s). One or more points from at least one of the convex landscapes is then used to generate the offer information.

§3. BRIEF DESCRIPTION OF THE DRAWINGS

FIG. 1 is a block diagram illustrating parties that may participate in an online advertising market.

FIG. 2 is a block diagram illustrating an exemplary online advertising environment in which, or with which, embodiments consistent with the present invention may be used.

§4. DETAILED DESCRIPTION

Figure 3:
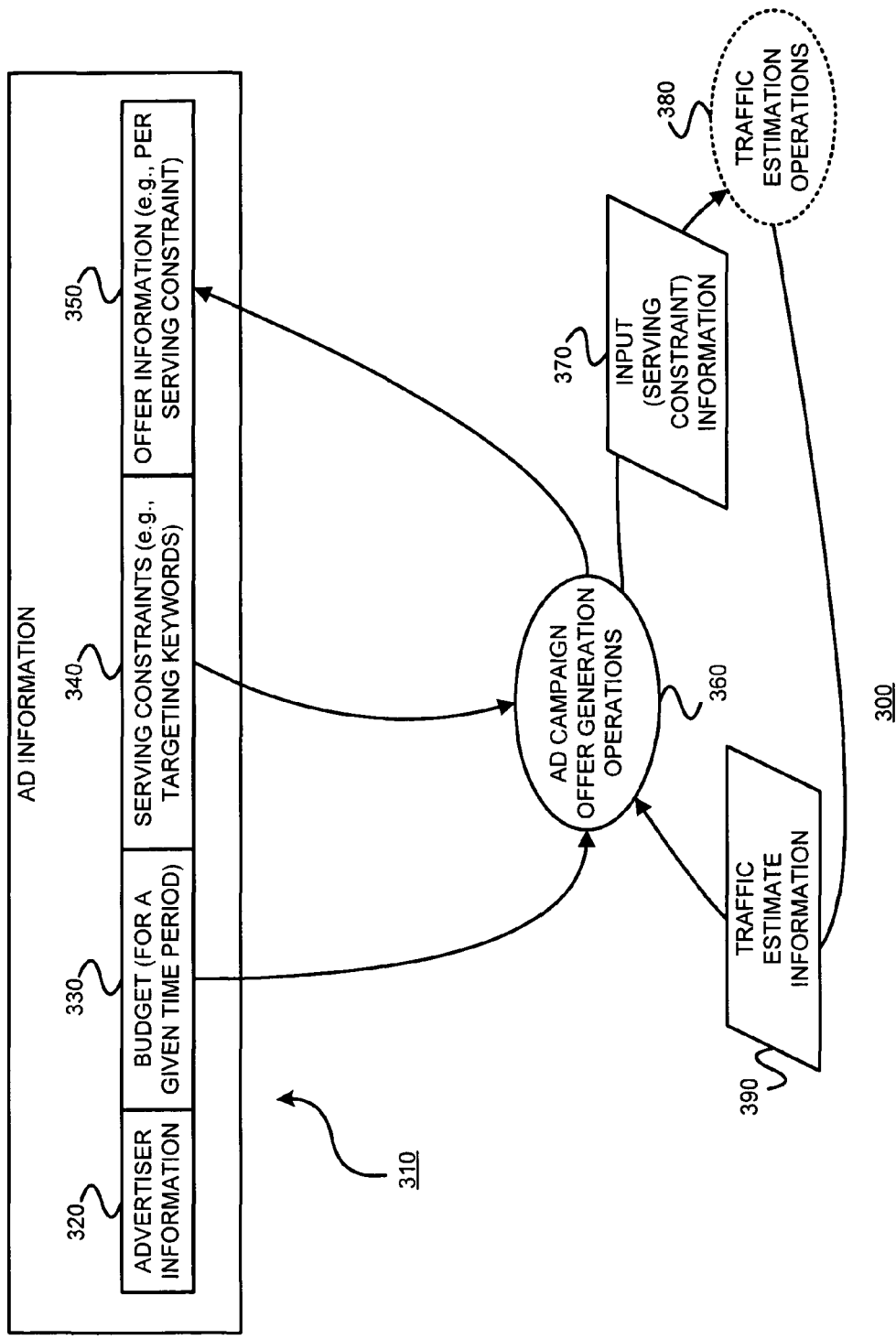
FIG. 3 is a bubble diagram of operations that may be performed in a manner consistent with the present invention, as well as information that may be generated and/or used by such operations.

The present invention may involve novel methods, apparatus, message formats, and/or data structures for helping advertisers to manage their advertising campaigns. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following, some terms that may be used in the specification are introduced in §4.1. Then, environments in which, or with which, the present invention may operate are described in §4.2. Exemplary embodiments of the present invention are then described in §4.3. Examples of operations are provided in §4.4. Finally, some conclusions regarding the present invention are set forth in §4.5.

§4.1 Definitions

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of ad selections (or the number of some other earlier event) are both referred to as the "conversion rate." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

"Ad area" may be used to describe an area (e.g., spatial and/or temporal) of a document reserved or made available to accommodate the rendering of ads. For example, Web pages often allocate a number of spots where ads can be rendered, referred to as "ad spots". As another example, an audio program may allocate "ad time slots".

An "offer" is something presented for acceptance. In some embodiments consistent with the present invention, an offer will often be a monetary amount, associated with an advertisement, to be paid, upon the occurrence of an act with respect to the advertisement (e.g., impression, selection, conversion, etc.). An offer may be a bid. In some embodiments consistent with the present invention, rather than defining a precise value to be paid, an offer may specify a maximum and/or a minimum amount to be paid. An offer may be non-monetary.

An "arbitration" is a process for determining one or more winning participants competing for something. An auction is an example of an arbitration.

§4.2 Exemplary Advertising Environments in which, or with which, the Present Invention May Operate FIG. 1 is a high level diagram of an advertising environment 100. The environment 100 may include an ad entry, maintenance and delivery system (simply referred to as an "ad server" or "ad delivery system") 120. Advertisers 110 may directly, or indirectly, enter, maintain, and track ad information in the system 120. The ads may be in the form of graphical ads such as so-called banner ads, text only ads, image ads, audio ads, animation ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or a selection related to the ad occurred) to the system 120. This usage information may include measured or observed user behavior related to ads that have been served.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from Mozilla, etc.), some other content rendering facility, an e-mail facility (e.g., Outlook from Microsoft), etc. A search engine 220 may permit user devices 250 to search collections of documents (e.g., Web pages). A content server 210 may permit user devices 250 to access documents. An e-mail server (such as Gmail from Google, Hotmail from Microsoft Network, Yahoo Mail, etc.) 240 may be used to provide e-mail functionality to user devices 250. An ad server (also referred to as an "ad delivery system") 210 may be used to serve ads to user devices 250. For example, the ads may be served in association with search results provided by the search engine 220. Alternatively, or in addition, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., a Web page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information, including the document content and advertisement(s), is then forwarded towards the end user device 250 that requested the document for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information, including the search results and advertisement(s), is then forwarded towards the user that submitted the search for presentation to the user. Preferably, the search results are maintained as distinct from the ads, so as not to confuse the user between paid advertisements and presumably neutral search results.

The search engine 220 may transmit information about the ad and when, where, and/or how the ad was to be rendered (e.g., position, click-through or not, impression time, impression date, size, conversion or not, etc.) back to the ad server 120/210. Such information may include information for determining on what basis the ad was determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.3 Exemplary Embodiments

The present invention may be used to help advertisers to manage their advertising campaigns, such as online advertising campaigns. For example, at least one embodiment consistent with the present invention may do so by determining offer information (e.g., maximum bids associated with various targeting keywords) given a budget and one or more serving constraints (e.g., targeting keywords).

FIG. 3 is a bubble diagram 300 of operations that may be performed in a manner consistent with the present invention, as well as information that may be generated and/or used by such operations. As shown, ad information 310 may include advertiser information 320, a budget limit (e.g., for a given time period) 330, serving constraints (e.g., targeting keywords) 340, and offer information (e.g., maximum bid per selection, associated with a targeting keyword, maximum bid per conversion, etc.) 350.

In at least some embodiments consistent with the present invention, an advertiser provides advertiser information 320, budget information 330 and one or more serving constraints 340, but not offer information 350. (Note that in some embodiments consistent with the present invention, at least some of the serving constraints may be derived from the ad creative, advertiser information, and/or from other serving constraints.) The offer information 350 may be generated using the budget information 330 and the serving constraint(s) 340. For example, ad campaign offer generation operations 360 may use the one or more ad serving constraints 340 as input information 370 provided to traffic estimation operations 380. The traffic estimation operations 380 can generate traffic estimate information 390 from such input information 370. The ad campaign offer generation operations 360 can then generate offer information 350 using the budget information 330 and the traffic estimate information 390.

Having described operations that may be performed in a manner consistent with the present invention, information that may be used and/or generated in a manner consistent with the present invention are now described in §4.3.1 below.

§4.3.1 Exemplary Data Structures

In at least one embodiment consistent with the present invention, the traffic estimate information 390 may include, for each serving constraint (e.g., a keyword), estimates for the number of impressions, average showing position, selection rate (e.g., click through rate or "CTR"), and paid cost per click (PCPC) for an ad shown on a given keyword (or some other serving constraint) as a function of an offer (e.g., a maximum offer per selection) for that keyword. These various estimates for each of various offers (e.g., maximum offers per selection) are referred to below as the "bid landscape."

Having described operations that may be performed in a manner consistent with the present invention, as well as information that may be used and/or generated in a manner consistent with the present invention, various exemplary methods that may be used to perform some of the various operations are now described in §4.3.2 below.

§4.3.2 Exemplary Methods

Figure 4:
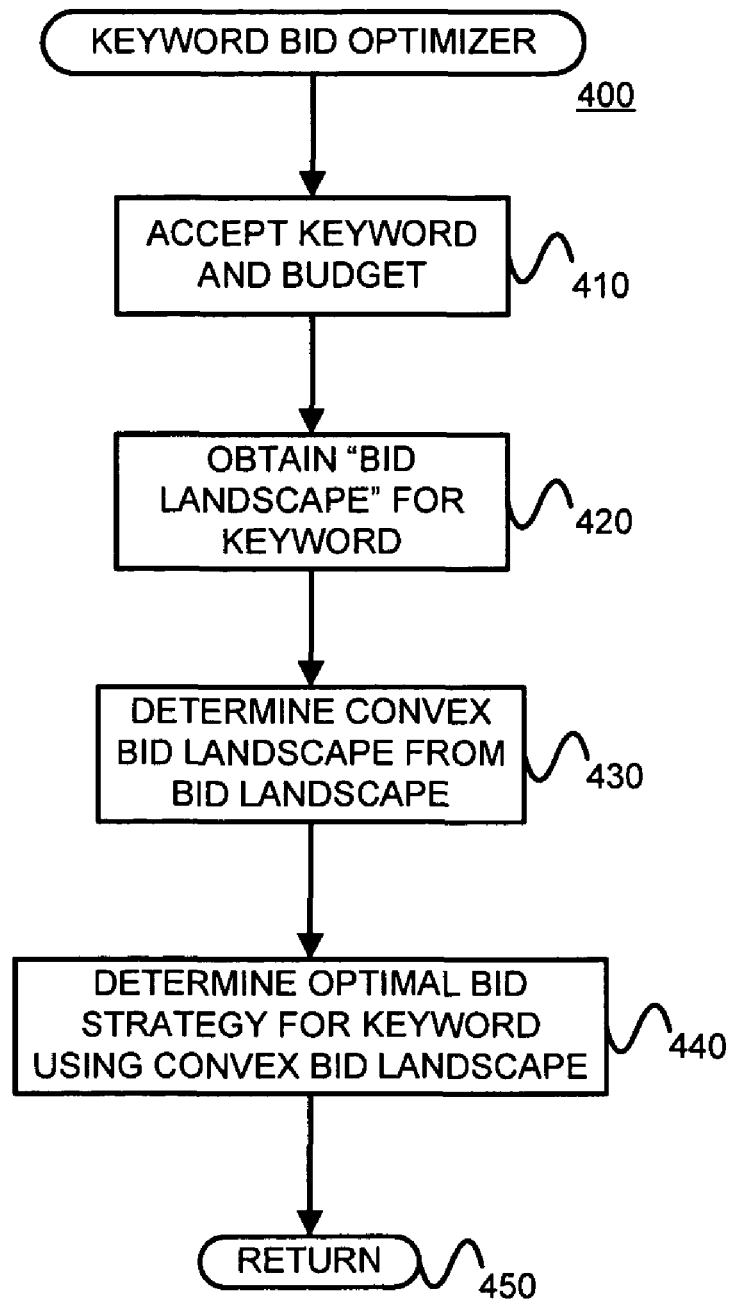
FIG. 4 is a flow diagram of an exemplary method that may be used to optimize keyword bids in a manner consistent with the present invention.

FIG. 4 is a flow diagram of an exemplary method 400 that may be used to determine an offer (e.g., a maximum bid per selection), or offers, for a given keyword (or some other serving constraint) in a manner consistent with the present invention. A targeting keyword and a budget (for a given time period) may be accepted. (Block 410) A bid landscape may then be obtained for the targeting keyword. (Block 420) A convex bid landscape (described in more detail below) may then be determined from the bid landscape. (Block 430) Finally, a bid strategy (e.g., an optimal bid strategy) for the targeting keyword may be determined using the convex bid landscape (Block 440) before the method 400 is left (Node 450).

Referring back to Block 420, the bid landscape may be obtained from a traffic estimator such as the one described in U.S. patent application Ser. No. 10/749,115 (referred to as "the '115 application" and incorporated herein by reference), filed Dec. 30, 2003, titled: "ESTIMATING COST AND/OR PERFORMANCE INFORMATION FOR AN ADVERTISEMENT IN AN ADVERTISING SYSTEM," by Arash Baratloo et al. for example.

Referring back to Block 430, a convex bid landscape may be determined from the bid landscape using a known convex hull algorithm such as Graham's Scan, Jarvis' March, and Quick Hull for example.

Referring back to Block 440, FIG. 5 is a flow diagram of an exemplary method 500 that may be used to determine an optimal bid strategy for a targeting keyword using a convex bid landscape. The points on the convex bid landscape (described below) are ordered from lowest CPC (or offer) to highest CPC (or offer). (Block 510) (Note that it is assumed that CPC (cost per selection or click) and eCPI (estimated cost per impression) are non-decreasing with increasing CTR. Thus, the points will also be ordered from lowest CPC to highest CPC, and from lowest eCPI to highest eCPI.) As indicated by loop 520-570 and decision block 540, a current bid position is saved (Block 530) for each bid point while there is at least some budget remaining after bidding on all incremental "results" (e.g., impressions, selections, conversions) at a current bid point. If there are no more bid points (loop 520-570), the method 500 is left (Node 580). Referring to decision block 540, when there is no budget remaining, the loop is exited and the method 500 determines a bid split fraction (f) (Block 550) and saves the current bid position and previous bid position and bid split fraction (Block 560), before the method 500 is left (Node 580). Still referring to blocks 550 and 560, the bid split fraction is used to allocate a budget over two bid positions when the budget cannot be exhausted at a single bid position. Thus, unless the budget can be spent at one bid position, the method 500 may output the current bid position, the previous bid position and a bid split fraction. The bid split fraction may be used to spend just enough at the higher bid point to consume all of the budget while getting as many results (e.g., impressions, selections, conversions) as possible at the lower bid point.

Figure 5:
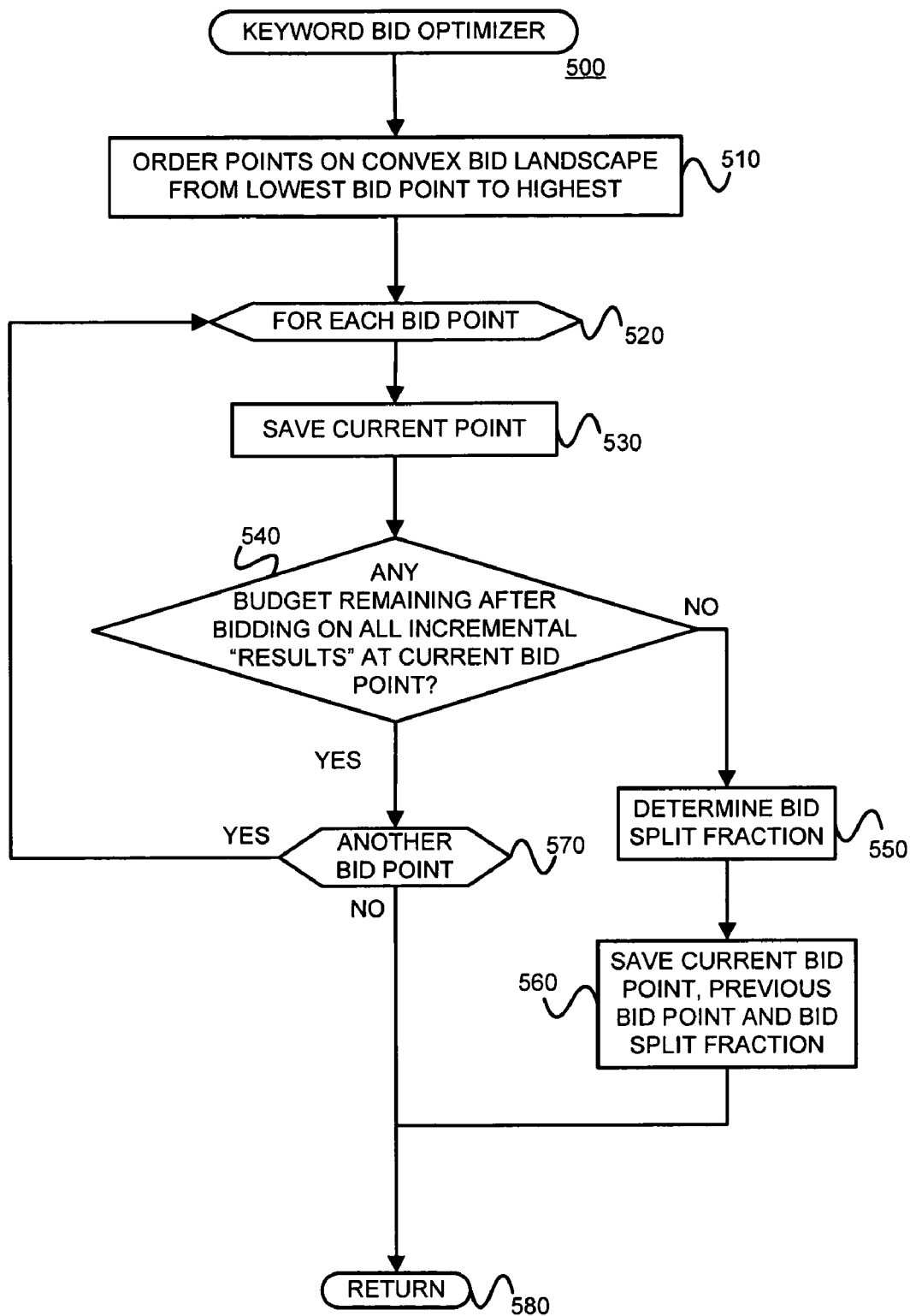
FIG. 5 is a flow diagram of an exemplary method that may be used to determine an optimal bid strategy for a targeting keyword using a convex bid landscape.
Figure 6:
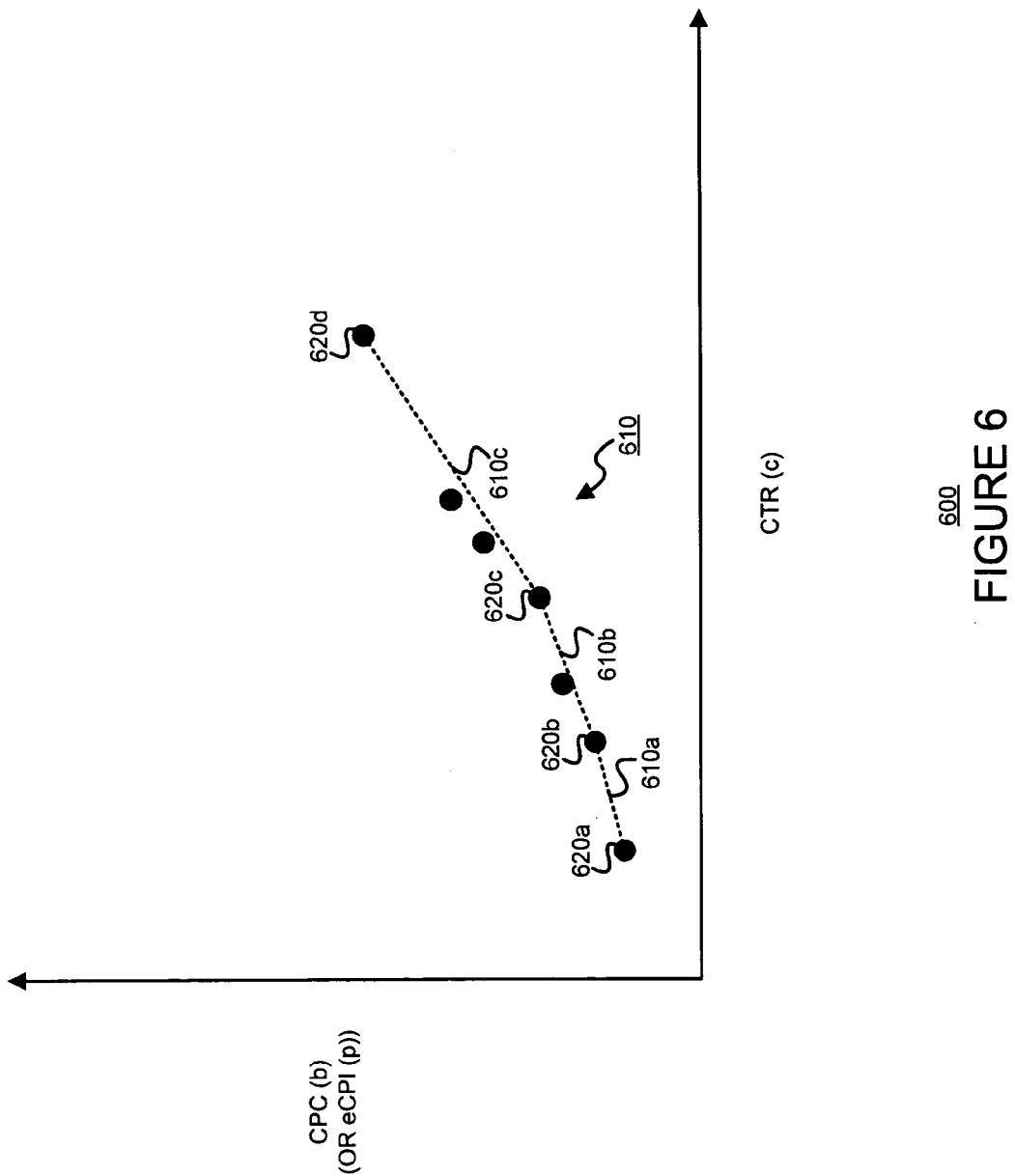
FIGS. 6 and 7 are graphs of selection rate as a function of cost per selection (or estimated cost per impression).

Referring back to block 430 of FIG. 4 and 510 of FIG. 5, the term "convex bid landscape" was introduced. An example of a convex bid landscape is now described with reference to FIG. 6. Generally, given a set of points, a convex hull is the smallest convex set containing all of the points. This can be thought of as a rubber band wrapped around the "outside" points. In this case, the lower side of the convex hull is used. FIG. 6 is a graph 600 of points of a bid landscape 610.

For a given keyword (or some other serving constraint), a set of bid landscape points $({}^i b_1, {}^i c_1, {}^i p_1), \ldots, ({}^i b_{mi}, {}^i c_{mi}, {}^i p_{mi})$ can be provided by the traffic estimator. These points may be sorted by increasing CTR. The CTR of the $j^{th}$ entry (i.e., the estimate of CTR for a given offer, or for some other independent variable being optimized) in the bid landscape for keyword i is denoted by ${}^i c_j$. The average paid CPC (cost per selection or click) is denoted by ${}^i b_j$. Finally, the eCPI is denoted by ${}^i p_j$ (eCPI is the product of CTR and CPC). In the following, when the keyword is obvious from context, the prefix superscript indicator is dropped.

In at least some embodiments consistent with the present invention, the total number of selections that can be obtained with the given budget and keyword is maximized. (Such embodiments may assume that the bid landscape doesn't change during the relevant budget period. Since this will likely not be true, the optimization can be re-run periodically.)

FIG. 6 illustrates the distribution of eCPI versus CTR, the slope between two bid points is the "incremental" cost per selection (e.g., click). The lower side of the convex hull of the eCPI/CTR curve 610 includes line segments 610a, 610b and 610c, and is defined as the portion of the convex hull from the point with the lowest CTR to the point with the highest CTR. For simplicity, the lower side of the convex hull of the eCPI/CTR distribution is simply referred to as "the convex hull" of the CPI/CTR distribution, and the bid points on the convex hull are referred to collectively as "the convex bid landscape."

Alternatively, a convex hull may be computed for {estimated selection, cost} points. The {eCPI, CTR points} are a special case of this, where the number of impressions is independent of the offer. In at least one exemplary embodiment consistent with the present invention, the traffic estimator returns the estimated number of impressions as a function of bid, and this data is used to determine the incremental cost per selection. (This detail is ignored in the following description for simplicity.)

When determining an optimal bid or bids, at least some embodiments consistent with the present invention use techniques that assume that it never makes sense to bid at any bid point that is not on the convex hull of the eCPI/CTR distribution. The rationale behind this assumption is illustrated by the following example. Let the bid landscape for the keyword be $(b_1, c_1, p_1), \ldots, (b_m, c_m, p_m)$. The slope of the eCPI/CTR curve between points x and y is $(p_y-p_x)/(c_y-c_x)$. This slope is the "incremental" click cost to move from one point in the convex bid landscape to another. To reiterate, this assumes that impressions are constant. Assume that an advertiser bids on a point i not on the convex hull. There must be two other points j and k that are on the convex hull such that $j<i<k$. Let j be the largest point that is less than i and is on the convex hull and k be the smallest point on the convex hull that is greater than i. By definition of the convex hull, $(p_i-p_j)/(c_i-c_j)>(p_k-p_j)/(c_k-c_j)$. This merely says that the slope between i and j is greater than the slope between k and j. Therefore, going from bid point j to bid point i has a higher incremental cost than going from bid point j to bid point k.

In the foregoing, it was assumed that CPC (and eCPI) is non-decreasing with increasing CTR. This in turn implies that determining bidding strategies for eCPI/CTR curves that have monotonically increasing incremental click cost is sufficient. Such bid landscapes are referred to as "convex bid landscapes."

It may be desirable to use different bids over the budget period. For example, using a first bid might provide the least expensive selections, but might not use (enough of) the budget, while using a second bid might use up the budget, but might provide more expensive selections. That is, usually, no single point on the convex bid landscape will consume the budget (B) exactly.

Figure 7:
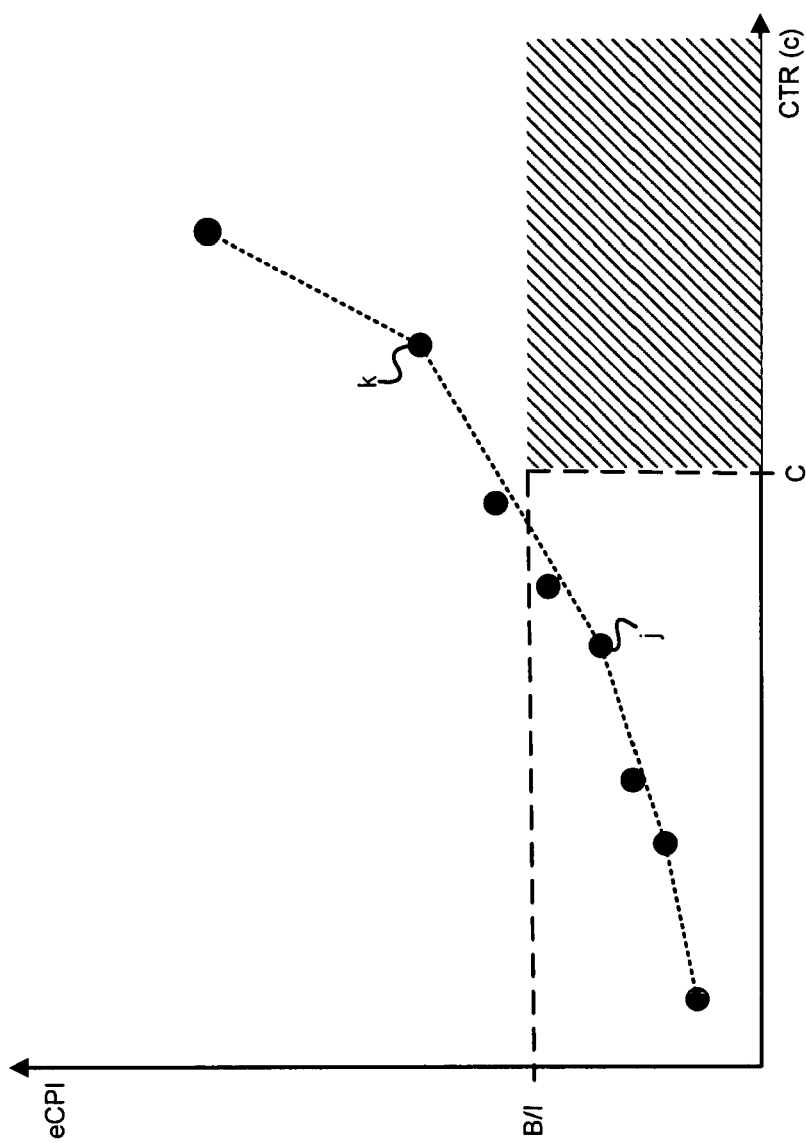

Some embodiments consistent with the present invention permit an ad to use different bids with the dual goals of getting the least expensive selections while using up the budget. Referring to FIG. 7, assume, for example, that point j is the largest bid on the convex hull that does not exhaust the budget, and bid point k is the smallest bid on the convex hull that exceeds the budget. It would be useful to determine a bid fraction "f" that combines bids corresponding to points j and k to reach the budget limit exactly. This may be expressed as:

$$p_j*f+p_k*(1-f)=B/l \quad [1]$$

where l is the estimated number of impressions, f is the fraction of bids at point j, and (1−f) is the fraction of bids at point k. The predicted selection rate (CTR) may be expressed as:

$$C=c_j*f+c_k*(1-f) \quad [2]$$

FIG. 7 is a hypothetical bid landscape which illustrates these relationships. This bidding strategy generates more selections than any other linear combination of bids that satisfy the budget constraint. Note, for example, that any point that generates more selections must fall to the right of the vertical line at C in FIG. 7. To satisfy the budget constraint, any reachable point must also fall on or below the horizontal line at B/l. This region, which is hatched in FIG. 7, lies entirely outside of the convex hull. By the nature of the convex hull, however, all linear combinations of points fall on or inside the convex hull. The optimal allocation of bids between points j and k can be easily determined by rearranging equation (1) above and solving for f, to obtain:

$$f=(p_k-B/l)/(p_k-p_j) \quad [3]$$

If the budget exceeds the total cost at the highest bid point, such that the point k does not exist, the optimal strategy may be to bid only on the highest bid point (which is necessarily on the convex hull), in which case the bid fraction (f) will be zero.

Note that although the inventory has been treated as a constant, the foregoing applies if the inventory varies between bid points, provided that the convex bid landscape is computed with respect to {cost, selection} points instead of {eCPI, CTR} points.

An exemplary algorithm for finding the optimal bidding strategy for a keyword is provided here:

```
INPUT: A convex bid landscape (b₁,c₁),...,(bₘ,cₘ);
       a budget B along with an inventory estimate I for the keyword.
OUTPUT: Two bids bᵢ and bᵢ₊₁ and a fraction f with which to bid bᵢ.
   (We bid bᵢ₊₁ the remaining 1 − f of the time.)
Algorithm SingleKeyword:
   Start with the first bid landscape point b₁,c₁.
   while (budget left)
      if (there is budget left to bid for all
             incremental clicks at the current position)
          record this bid as the current strategy, move to next landscape point
      else
          output current position, previous position and bidding fraction.
   quit.
```

The foregoing algorithm "SingleKeyword" may be used to find the bidding strategy that maximizes clicks. At each point, the algorithm bids for additional clicks at the smallest possible incremental cost.

Two special cases of the algorithm are now discussed. If $B<=l*b_1*c_1$, then $b_1$ is bid until the budget is exhausted. If $B>=l*b_m*c_m$, then $b_m$ is bid until the inventory runs out. In the general case in which there are two positions—i and i+1—such that $l*b_i*c_i<B<l*b_{i+1}*c_{i+1}$, the higher position is bid on just frequently enough to consume all of the budget, while getting as many clicks as possible at the lower position. This can be accomplished by solving the equation:

$$f*l*b_i*c_i+(1-f)l*b_{i+1}*c_{i+1}=B \quad [4]$$

which is a form of equation [1] above.

Once determined, the fractional bidding strategy just described may be effected by changing the bid for a keyword during the budget period. The timescale for such changes may vary depending on the exact implementation used. At one extreme, the bid may be changed at each potential rendering of the ad. For example, a random number generator may be used to select the low bid with probability f (else the high bid), or the high bid with probability (1−f) (else the low bid) for each arbitration or auction. At another extreme, a single bid may be chosen at each bid update period and kept constant until a subsequent optimization update. For example, by initially choosing the low bid, the ad campaign will presumably undershoot the ideal spending rate (i.e., the spending rate that would exhaust the budget exactly at the end of the budget period). That is, the ad campaign will initially underspend. The accumulated reserve budget should make a subsequent higher bid affordable, at which time, the bid may be changed to the higher bid. Thus, for example, the lower bid may generate an expected surplus which will be used to fund the subsequent higher bid. Note that the higher bid can be initially chosen and later switched to the lower bid. In such a case, the higher bid may generate an expected deficit which should be made up by the subsequent lower bid.

Figure 8:
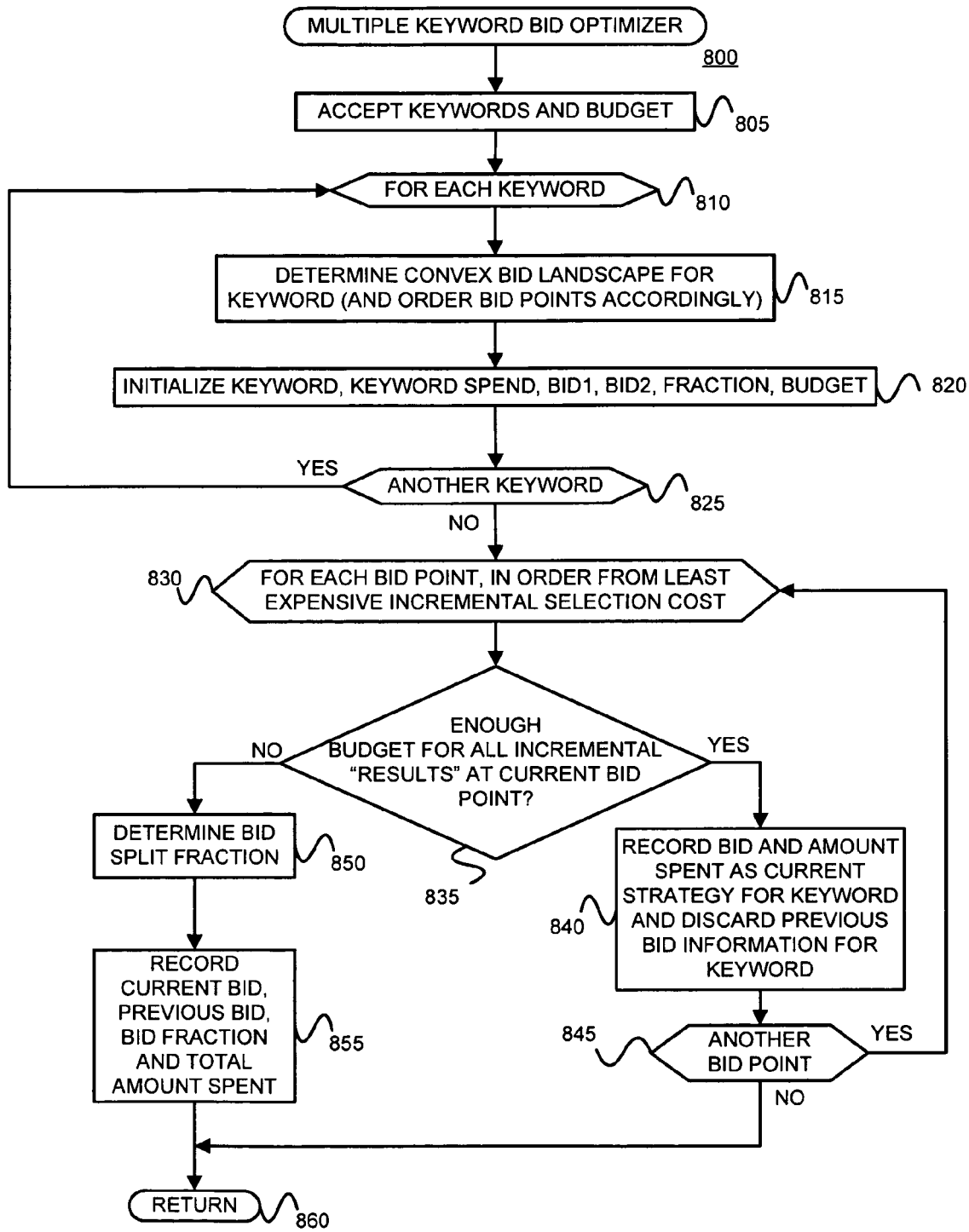
FIG. 8 is a flow diagram of an exemplary method that may be used to optimize bids over a plurality of keywords in a manner consistent with the present invention.

FIG. 8 is a flow diagram of an exemplary method 800 that may be used to optimize bids over a plurality of keywords in a manner consistent with the present invention. Keywords and a budget are accepted. (Block 805) As indicated by loop 810-825, convex bid landscapes may be determined for each keyword (Block 815), and various output values may be initialized for each keyword (Block 820). The determination of convex bid landscapes may be performed as described above.

Referring to loop 830-845, a number of acts may be performed for each bid point (across all keywords), in order from least expensive incremental cost to most expensive incremental cost. However, this loop 830-845 may be left once the budget is spent. More specifically, it is determined whether there is enough remaining budget for all incremental "results" (e.g., impressions, selections, conversions) at the current convex bid landscape point. (Decision block 835) If not, the bid fraction (f) is determined (Block 855) and the current bid, previous bid, bid fraction and total amount spent may be saved (Block 855) before the method 800 is left (Node 860). Thus, unless the budget can be spent at one bid position, the method 800 may output the last bid position, the previous bid position and a bid fraction. Referring back to decision block 835, if there is enough in the remaining budget for all incremental "results" (e.g., impressions, selections, conversions) at the current convex bid landscape point, the bid and amount spend are stored as a current (best) strategy for the keyword, and any previous bid information for the keyword is discarded (Block 840) and a next bid point (if one is available) is processed (Loop 830-845). If there are no more bid points, the method 800 may be left. (Node 860)

Although the method 800 may be left when the entire budget is spent or when there are no more bid points to process, in practice, except for inventory limited campaigns, the budget should be spent before all of the convex bid landscape points are considered. If this were to occur, it would be a waste of resources to pre-order all of the bid landscape points over all of the keywords for loop 830-845. At least some embodiments consistent with the present invention may avoid pre-ordering too many convex bid landscape points. For example, such embodiments might use a priority queue to select bid landscape positions for each keyword in order of increasing incremental selection costs. The queue is initialized with the first bid landscape point for each keyword. At each step, the first element (which corresponds to the convex bid landscape point with the lowest incremental selection cost) is removed from the queue. If choosing this new point for the corresponding keyword does not exhaust the budget, it is recorded as the active bid and the next convex bid landscape point is inserted into the queue. This process is repeated until the queue is empty. Using a priority queue in this way effects a merge-sort of convex bid landscape points, as needed, from all the keywords.

An exemplary algorithm for finding the optimal bidding strategy for multiple keywords is provided here:

```
Algorithm Autobidder:
    Process all input bid landscapes into convex bid landscapes
  using a convex hull algorithm.
    Take the first bid landscape point from each keyword and
  insert them into a priority queue ordered by increasing incremental
  click cost.
    Initialize output hash hashed by keyword and pointing to a
  structure consisting of the current budget for the keyword, two bids
  and a bidding fraction.
      while (budget left to spend)
        Dequeue the bid landscape point with the
```

-continued

```
        cheapest incremental click cost
          If there is enough budget to buy all the
        incremental clicks at that point
          then
            record the bid and the amount being spent
          as the current strategy for that keyword and
          discard the previous bid information for the
          keyword
            insert the next bid landscape point from the
          current keyword into the priority queue
          else
            return the current set of keyword, bid
          combinations as the result.
```

This algorithm returns a set of bids for the input keywords. Since it is possible to run out of budget exactly once, exactly one keyword might have two bids (and a bid fraction for the two bids). In one exemplary embodiment consistent with the present invention, a keyword that has no bids can be dropped. Alternatively, the bid can be set to zero. Thus, the rest of the keywords will have at most a single bid, and possibly no bids.

This algorithm may be used to maximize clicks from a set of keywords. Assuming convex bid landscapes for each keyword, by using a priority queue, the bid landscape point with the lowest incremental click cost available across all keywords is considered first.

If there are n keywords and at most m bid landscape positions per keyword, the algorithm takes no more than $O(n*m*(1+\log(n)) \approx O(n*m*\log(n)))$ time to run. More specifically, the loop that runs through the convex landscapes using a priority queue can takes $\log(n)$ per iteration (since there are n keywords). Since there are a total of $n*m$ points, this portion of the algorithm can take $O(n*m*\log(n))$ time.

§4.3.3 Exemplary Apparatus

Figure 9:
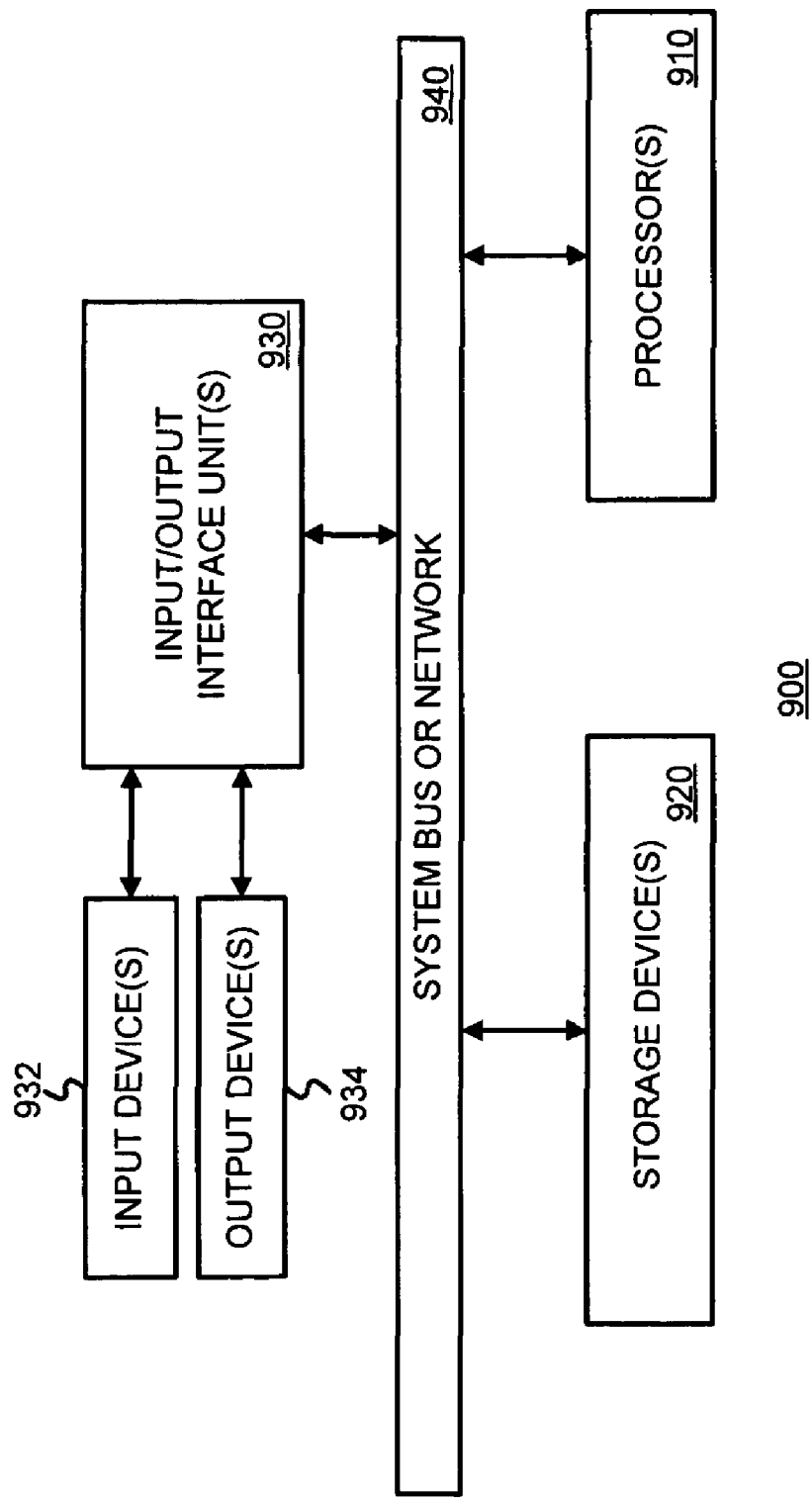
FIG. 9 is block diagram of a machine that may perform one or more operations and store information used and/or generated in a manner consistent with the present invention.

FIG. 9 is block diagram of a machine 900 that may perform one or more of the operations discussed above. The machine 900 may include one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++, Java, etc., running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 920 and/or may be received from an external source via one or more input interface units 930.

In one embodiment, the machine 900 may be one or more conventional personal computers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other output devices (not shown), such as speakers and printers for example.

The various operations described above may be performed by one or more machines 900, and the various information described above may be stored on one or more machines 900. The ad server 210, search engine 220, content server 230, e-mail server 240, user device 250, and/or related ad link server 260 may include one or more machines 900.

§4.3.4 Refinements and Alternatives

The exemplary methods described in §4.3.2 above are simple and can be implemented in a few hundred lines of code, such as a python script that looks at an advertising campaign and determines a bid (e.g., an optimal bid) for each keyword.

In at least some embodiments consistent with the present invention, the budget period may be one or more months, or at least several weeks. In at least some embodiments consistent with the present invention, the bid(s) may be re-determined for each managed ad campaign. This permits optimal bids to be maintained as the available budget is consumed and the keyword bid landscapes change. Thus, for example, for a given ad campaign (which may be an advertisement, or some group of ads intended to share common targeting and budget constraints), the bids can be re-determined periodically (e.g., daily), using current inventory, eCPC and CTR estimates from a traffic estimator. In such an exemplary embodiment, for each managed ad campaign, the keyword bids may be adjusted (e.g., as described above). This approach of daily re-determinations neglects intraday CTR and eCPC variations, but enhances the stability of the bidding solution. The period of bid re-determination may be shortened (to account for intraday variations), or lengthened (to enhance stability or reduce computational costs, particularly if intraday variations are small or tend to average out over the budget time period).

A budget may be applied on a per keyword basis, or on a per ad or ad campaign basis. In the later case, a single budget may be allocated across a set of one or more keywords. Embodiments consistent with the present invention can work in either scenario. Further, a budget for a given longer time period (e.g., monthly) may be divided across smaller time periods (e.g., daily). Embodiments consistent with the present invention can make determinations based on the longer time period and the budget provided, or based on the shorter time periods and "virtual budgets" derived from the budget.

In at least some embodiments consistent with the present invention, a "dual" bidding strategy (where one keyword should be bid at two different positions) may be performed by first bidding low (or high) for a certain period of time (e.g., number of days) and then switching. In this way, in the case of an initially low bid, an expected budget surplus is generated which may be subsequently used on higher bids. Similarly, in the case of an initially high bid, an expected budget deficit is generated which may be subsequently compensated for by lower bids. The length of time for each of the low and high bids may be determined using the "bid fraction" described above. Assuming fairly uniform ad serving, a ratio of the lengths of time may correspond to the bid fraction. Non-uniformities in ad serving (e.g., more ads targeted to movies served and selected on Fridays and Saturdays) may be accounted for (e.g., by the traffic estimator). Alternatively, expected surpluses or deficits may be handled by periodically (at one or more time periods within the budget period), re-determining optimal bids. As discussed above, the period of bid re-determination may be shortened (to account for intraday variations), or lengthened (to enhance stability or reduce computational costs, particularly if intraday variations are small or tend to average out over the budget time period). In embodiments without keyword level budgets, bidding high can lead to starvation for low bid keywords. Accordingly, in such embodiments, it may be preferable to bid low on the dual bid keyword first.

At least some embodiments consistent with the present invention may present a simple user interface for the advertisers. For example, when creating a new campaign, the advertiser can choose to place the campaign under "automated bid management". A Boolean flag may be used (e.g., at the ad campaign level, and/or at the ad group level, etc.) to indicate whether the campaign (and/or ad group, etc.) is under "autobidder" control. In at least some embodiments consistent with the present invention, users may be allowed to edit bids for campaigns having bids that are automatically determined. In at least some such embodiments, the user provided bid may be overwritten, while in at least some others, the user provided bid may not be overwritten. In at least some embodiments consistent with the present invention, the advertiser may provide budget constraints on particular targeting criteria (e.g., particular keywords), and/or on an ad or ad campaign.

Recall that a traffic estimator may be used to provide estimates of CTR and CPC for various keywords (or some other serving constraint). However, actual statistics (e.g., CTR and CPC) of an advertiser's adgroup can be tracked. For instance, suppose the adgroup is to run for three (3) months (or has a budget period of three months). After running automated bid management for a portion of the three (3) month period (e.g., two (2) weeks), the ad targeted with keyword k may have been placed at various positions. For each of these positions, the actual CTR achieved by the ad can be tracked. (The CTR produced by a traffic estimator can be based on an average CTR which might not be the same as the actual CTR achieved by the advertiser's ad for keyword k.) The CPC can be tracked as well. As statistics are accumulated over time, at least some embodiments consistent with the present invention may use these measurements to supplement (e.g., at first) and/or replace (e.g., later) the CTR and CPC produced by the traffic estimator for computing the bid landscape. Further, if the inventory is limited, the number of impressions (I) for the keyword k can be tracked. (If budget limited, the I estimates may still be used, but these estimates should be more stable than the estimates for CTR and CPC.)

At least some embodiments consistent with the present invention may avoid bid instabilities. Instabilities may be avoided due to the inherent operation of a bid determination algorithm, and/or by smoothing and/or filtering traffic estimates. For example, one possible side-effect of the automatic bid determination is that a price war for a given keyword k may occur when two or more advertisers use "automated bid management" on that keyword. However, the CPC for k will increase in such a case. The CPC estimates (which may be updated periodically (e.g., daily)) from a traffic estimator will therefore change (and/or, if tracked, the actual CPC value for the ad(s) may change). When the CPCs for k rise without any increase in CTR, the marginal cost per selection will increase. (Recall the slope of the convex bid landscape.) This will cause the available budget to be shifted away from k to gain less expensive selections from other keywords automatically.

In at least some embodiments consistent with the present invention, the traffic estimator values may be averaged over multiple days, thereby suppressing transient fluctuations in CPC (that may be caused by the daily bid updates) in the bid landscapes used to generate successive updates. This averaging or smoothing of traffic estimates should prevent unstable feedback between competing advertisers using automated bid management. In embodiments that directly use (e.g., daily) statistics from the ads themselves, temporal filtering may be used to smooth transient fluctuations.

Although some of the embodiments were described in the context of receiving keywords from advertisers, in at least some embodiments consistent with the present invention, at least some keywords (and/or other serving constraints to be bid on) may be inferred or determined from other ad information (e.g., keyword, concept, temporal or geolocation targeting using information extracted from the ad creative, geolocation targeting information extracted from advertiser address information, etc.).

In at least some of the foregoing examples, it was assumed that it was possible to obtain a landscape for each keyword which indicated how much had to be bid (and paid) to get to a certain position in an auction. However, because traffic estimates may combine (e.g., average) many arbitrations, fractional position points may be returned back from the traffic estimator. Further, bidding exactly to the highest position is often exorbitantly expensive because of the presence of campaigns with a limited budget and high bids. (Under auctions that apply price discounting to maximum bids, the actual paid (CPC) for a given keyword depends on who is in the actual auction, of course, and is typically much lower than the amount bid.)

One advantage of dealing with a more continuous CPC/CTR landscape is that it offers more options for spending a budget effectively than a landscape that only has a few position/CPC pairs. Also, bidding high to get to position one (even if the paid CPC is much lower) introduces uncertainty because paid CPC can change dramatically with changes in the competitive auction landscape (e.g., a new competitor that bids just below a high maximum offer would lead to paying much higher costs.) Therefore, at least some embodiments consistent with the present invention may assume that the bid landscape is continuous. One assumption may be that CTR is non-decreasing with CPC. One corollary of this assumption is that cost per impression (CPI), which is really CPC*CTR, is also non-decreasing with increasing CTR. If this assumption does not hold true, it can be enforced by filtering out "landscape points" generated by the traffic estimator that violate the assumption.

Although many of the exemplary embodiments were described in the context of targeting keywords, embodiments consistent with the present invention may be used in the context of other serving constraints (e.g., location targeting, concept targeting, user targeting, temporal targeting, etc.).

Further, although many of the exemplary embodiments were described in the context of a maximum bid per selection, embodiments consistent with the present invention may be used to determine other offers (e.g., offer, maximum offer, or average offer per impression, selection or conversion).

Although many of the foregoing exemplary embodiments were described in the context of maximizing a number of selections (e.g., clicks) while consuming a budget, embodiments consistent with the present invention may be used maximize some other notion of value to the advertiser. For example, different selections may have different values (e.g., in terms of conversion rate). Thus, for example, selections could be weighted using (i) an advertiser-specified value (e.g., per AdGroup), which may be a good indicator of advertiser margin, and/or (ii) actual value (e.g., conversion) information. Such embodiments could be used to maximize any of a number of different notions of advertiser value per unit cost (e.g., as specified by the advertiser and/or as determined). Another example of advertiser value is return-on-investment (ROI).

§4.4 Examples of Operations

The following examples illustrate how an exemplary implementation of the present invention may be used to manage offers. Assume that an advertiser wants to spend a certain amount of money over some period of time (e.g., a month). Assume further that the advertiser is interested in two keywords—k1 and k2—and wants to maximize the total number of selections received, subject to their budget. Finally, assume that the only parameters that the advertiser can control are the total budget.

Estimates for the number of impressions, average showing position, selection rate (CTR), and cost per selection (CPC) for an ad on a given keyword, as a function of the bid for that keyword, are obtained (e.g., from a traffic estimator). TABLES I and II below provide exemplary bid landscapes for keywords k1 and k2, respectively. Only a few bid landscape points corresponding to integral display positions are given. Although realistic bid landscapes may include many more points for arbitrary (non-integral) display positions, these simplified examples serve to illustrate aspects of bid optimization.

TABLE I

BID LANDSCAPE FOR K1

| position | inventory | ctr | numclicks | cost per click | total cost |
|---|---|---|---|---|---|
| 1 | 1000 | 0.05 | 50 | $2.50 | $125.00 |
| 2 | 1000 | 0.011 | 11 | $2.00 | $ 22.00 |
| 3 | 1000 | 0.01 | 10 | $1.00 | $ 10.00 |

Keyword k1 has an inventory of 1000 queries. To simplify this example, assume that the inventory does not depend on position. The CTR for position 1 is 5%, which leads to 50 clicks over 1000 queries. Since each click costs $2.50, the 50 clicks would cost of $125.00. Position 2 has a substantially lower clickthrough rate and a slightly lower cost per click. Compared to position 2, position 3 has a slightly lower clickthrough rate and a much lower cost per click.

TABLE II

BID LANDSCAPE FOR K2

| position | inventory | ctr | numclicks | cost per click | total cost |
|---|---|---|---|---|---|
| 1 | 500 | 0.022 | 11 | $2.00 | $22.00 |
| 2 | 500 | 0.02 | 10 | $0.50 | $ 5.00 |

The bid landscape shown for keyword K2 has two positions. (This may be because all queries for k2 are from a partner site that only shows two positions.) There is an inventory of 500 queries that match k2. For position 1, it achieves a 2.2% clickthrough rate, leading to 11 clicks. At $2.00 per click, it will cost the advertiser $22.00 to get those 11 clicks. Position 2 has a slightly lower clickthrough rate but a much lower cost per click.

Figure 10:
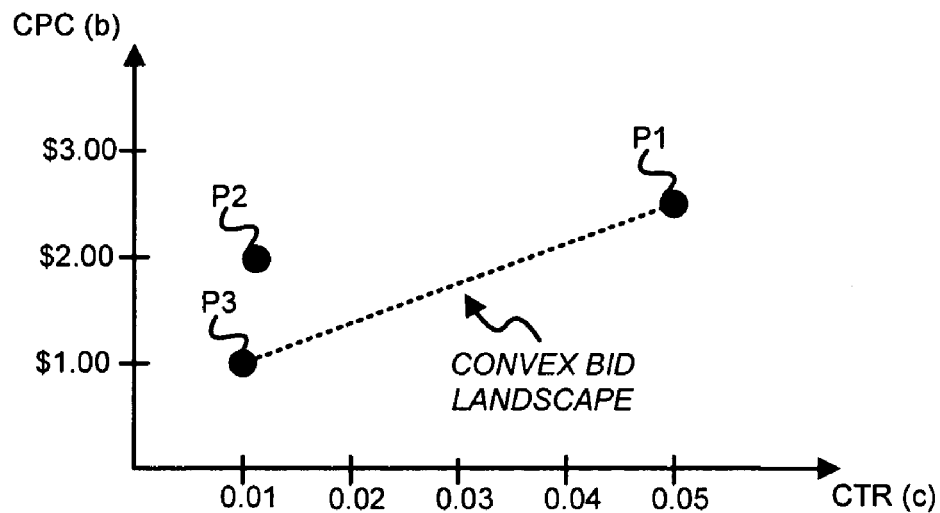
FIGS. 10 and 11 are graphs of bid landscapes for two different targeting keywords.
Figure 11:
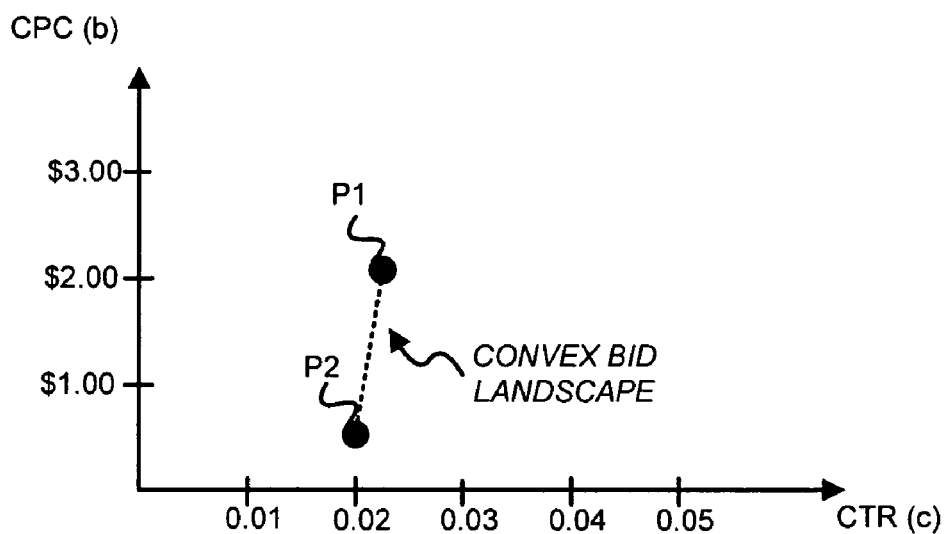

FIGS. 10 and 11 show bid landscapes for K1 and K2, respectively. In FIG. 10, notice that point P2 is not a point on the convex bid landscape.

When considering the problem of optimizing the (expected) total number of clicks obtained, there are many possibilities for bid and budget allocation even with the bid landscape information. In this example, it is possible to split the inventory for k1 arbitrarily among the three positions, and similarly for k2 among the two positions. In the following scenarios, some actual budget amounts are considered, and bidding solutions that illustrate the optimization problem are provided.

Under a first scenario, assume that the advertiser's budget is $10 over the relevant time period. In this case, it is clear that the budget can be best spent by (i) "reserving" $5 of the $10 for keyword k2 and bidding $0.50 to receive 10 clicks at position 2, and (ii) using the remaining $5 by bidding $1.00 for keyword k1 to receive an additional 5 clicks. This scenario illustrates that to maximize the total number of clicks, it is important to "reserve" budgets for "cheap" keywords even if inventory is available with a more "expensive" keyword.

Under a second scenario, assume that the advertiser's budget is $130. The optimal solution in this case is to show an ad for all the queries matching k1 at position 1, and for all the queries matching k2 at position 2. It makes sense to choose position 1 for k1 because the other two positions do not produce enough clicks. Further, the budget of $130.00 can cover the cost of $125.00. Note that although being in position 1 for K2 gets an additional click (i.e., 11 clicks vs. 10 clicks), the additional cost is significant (i.e., $22.00−5.00). This is indicated by the steep slope between bid points P1 and P2 in FIG. 10. Rather than spending this $17.00 on the additional click for k2, it is much better spent getting the clicks (at $2.50/click) for k1 at position 1.

The second scenario illustrates the concept of "incremental click costs" in ad servers that use an auction model structured such that moving up into a higher slot forces the advertiser to pay for all their clicks at the higher cost. This may have many undesirable side-effects. For example, the incremental cost can often be much higher than the bid cost at the higher position (e.g., $17.00 versus $2.00).

In a third scenario, assume that the advertiser is only interested in keyword K1, and has a budget of $20.00. Assume further that the advertiser wants to maximize the number of clicks without exceeding its budget. Bidding on just position 3 gets the advertiser 10 clicks, but doesn't spend the entire budget ($10.00 is left over). However, as described above, at least some embodiments consistent with the present invention may use different bids at different times. Thus, it is possible to bid for one of the higher positions some of the time, while bidding on one or more of the other positions at other times. In this case, the optimal strategy may be to bid on positions 1 and 3 with probabilities 2/23 and 21/23, respectively. That is, for 1000*2/23 of the impressions, $2.50 is bid for position 1 and for 1000*21/23 of the impressions, and $1 is bid for position 3. A total of 13.5 clicks (on average) are generated. It is clear that more than 11 clicks cannot be had by bidding on any combination of positions 2 and 3. This scenario shows that incremental click cost should be used when determining the optimal bidding strategy. When considering incremental click cost, note that position 2 is intuitively a bad position to bid on since the additional click comes at a great incremental cost (11*2−10*1=$12). This is illustrated in FIG. 10, which shows that bid landscape point P2 is not on the convex bid landscape. Position 1, even though it has a more expensive cost per click, has a much better incremental click cost ((50*2.50−10*1)/(50−10)=$2.875) relative to position 3.

In a fourth scenario, assume that the advertiser has a budget of $150.00 for both the keywords. The advertiser can cover the extra cost for getting the one additional click produced by position 1 for k2. In this case, the optimal solution would be to show at position 1 for both k1 and k2.

As illustrated by the foregoing scenarios, the total budget might have to be allocated to different keywords to maximize the number of clicks. Incremental click cost should be considered when determining which positions to bid on. A lower CPC does not necessarily mean that a position is better. The foregoing examples used "discrete" (traffic estimator output for only integer showing positions in the auction) landscapes to simplify the presentation. That is, only bids, clicks, impressions, and ctr for position 1, position 2, etc., were considered. Continuous landscapes include non-integral showing positions. In some embodiments consistent with the present invention, the traffic estimator output for a keyword is a function of bid CPC (offer), and the resulting CTR, impression, click, and position estimates are averages that can take on any real value.

§4.5 Conclusions

As can be appreciated from the foregoing disclosure, the present invention can be used advantageously to help advertisers to optimize a goal (e.g., maximize selections) given a budget constraint. In at least some embodiments consistent with the present invention, the advertiser only needs to supply one or more serving constraints (e.g., targeting keyword(s)) and a budget limit. Moreover, in some embodiments consistent with the present invention, the advertiser merely provides a budget and an ad (e.g., ad creative text, an ad landing page, etc.). Targeting keywords may be automatically extracted from the ad or its landing page. Then, bids can be automatically determined for such targeting keywords

What is claimed is:
1. A computer-implemented method comprising:
 a) accepting, using a computer system including at least one processor, at least one storage device, and at least one input interface, an ad budget and at least one ad serving constraint; and
 b) generating, using the computer system, offer information using the ad budget and the at least one serving constraint, wherein the act of generating offer information includes
  i) obtaining, for each of the at least one ad serving constraint, a plurality of points, each point including
   A) a cost per event value, and
   B) an event quantity value,
   wherein the points collectively define a landscape;
  ii) determining, for each of the at least one ad serving constraint, a convex landscape from the landscape, and
  iii) using one or more points from at least one of the convex landscapes to generate the offer information.
2. The computer-implemented method of claim 1 wherein the act of generating offer information allocates the ad budget under a policy to increase at least one of (A) ad impressions,

(B) ad selections, (C) ad conversions, (D) advertiser margin, and (E) advertiser return-on-investment.

3. The computer-implemented method of claim 2 wherein the act of the allocating the ad budget considers, for a given one of the at least one ad constraint, offers in an order of at least one of (A) increasing impression costs, (B) increasing selection costs, and (C) increasing conversion costs, (D) decreasing advertiser margin, and (E) decreasing advertiser return-on-investment.

4. The computer-implemented method of claim 2 wherein the act of allocating the ad budget considers, for all of the at least one ad constraint, offers in an order of at least one of (A) increasing impression costs, (B) increasing selection costs, (C) increasing conversion costs, (D) decreasing advertiser margin, and (E) decreasing advertiser return-on-investment.

5. The computer-implemented method of claim 1 wherein the act of using one or more points from at least one of the convex landscapes to generate offer information includes
  A) ordering points on a convex landscape from a lowest cost per event point to a highest cost per event point to define a set of ordered points,
  B) while there is budget remaining, processing the points in the set of ordered points on the convex landscape, in order from the lowest cost per event point to the highest cost per event point, to record the offer per event associated with a current point as a current offer strategy, and
  C) when there is no budget remaining,
    1) determining an offer allocation fraction, and
    2) saving the cost per event of the current point, the cost per event of a point immediately previous to the current point, and the offer allocation fraction.

6. The computer-implemented method of claim 1 wherein at least one of the at least one serving constraints is a targeting keyword.

7. The computer-implemented method of claim 1 wherein at least one of the at least one serving constraints is a targeting concept.

8. The computer-implemented method of claim 1 wherein at least one of the at least one serving constraints is a targeting geolocation.

9. The computer-implemented method of claim 1 wherein the offer information includes at least one offer selected from a group of offers consisting of (A) an offer per impression, (B) an offer per selection, and (C) an offer per conversion.

10. The computer-implemented method of claim 1 wherein the offer information includes at least one offer selected from a group of offers consisting of (A) a maximum offer per impression, (B) a maximum offer per selection, and (C) a maximum offer per conversion.

11. A computer-implemented method comprising:
  a) accepting, using a computer system including at least one processor, at least one storage device, and at least one input interface, an ad budget and at least two ad serving constraints; and
  b) for each of the at least two ad serving constraints,
    i) obtaining, using the computer system, a plurality of points, each point including a cost per event value, and an event number value, and the points collectively defining a landscape, and
    ii) determining, using the computer system, a convex landscape from the landscape; and
  c) getting, using the computer system, a least expensive point from the plurality of determined convex landscapes;
  d) determining, using the computer system, if the budget is enough to pay for all incremental events at the current point;
  e) when it is determined that the budget is not enough to pay for all incremental events at the current point, then determining, using the computer system, an offer allocation between the current point and any previously recorded point; and
  f) when it is determined that the budget is enough to pay for all incremental events at the current point, then
    i) recording, using the computer system, a cost per event value of the point for the serving constraint associated with the point,
    ii) getting, using the computer system, the next least expensive point from the plurality of determined convex landscapes, and
    iii) returning, using the computer system, to act (d) above.

12. The computer-implemented method of claim 11 wherein the act of getting the least expensive point from the plurality of determined convex landscapes includes getting the first convex landscape point for each of the at least two serving constraints and storing them in a data structure ordered by increasing incremental event cost.

13. The computer-implemented method of claim 12 wherein the act of getting the next least expensive point from the plurality of determined convex landscapes includes
  when it is determined that the budget is enough to pay for all incremental events at the current point, then further inserting a next least expensive convex landscape point from the current serving constraint into the data structure so that it is
  after any convex landscape point, already stored in the data structure, that is less expensive than it, and
  before any convex landscape point, already stored in the data structure, that is more expensive than it.

14. The computer-implemented method of claim 11 wherein at least one of the at least two serving constraints is a targeting keyword.

15. The computer-implemented method of claim 11 wherein at least one of the at least two serving constraints is a targeting concept.

16. The computer-implemented method of claim 11 wherein at least one of the at least two serving constraints is a targeting geolocation.

17. The computer-implemented method of claim 11 wherein the offer information includes at least one offer selected from a group of offers consisting of (A) an offer per impression, (B) an offer per selection, and (C) an offer per conversion.

18. The computer-implemented method of claim 11 wherein the offer information includes at least one offer selected from a group of offers consisting of (A) a maximum offer per impression, (B) a maximum offer per selection, and (C) a maximum offer per conversion.

19. A computer-implemented method comprising:
  a) accepting, using a computer system including at least one processor, at least one storage device, and at least one input interface, an ad budget and at least one ad serving constraint;
  b) using the at least one serving constraint as an input to request traffic estimates for the ad when served under each of the at least one serving constraint;
  c) receiving traffic estimates for the ad when served under each of the at least one serving constraint, wherein the traffic estimate information includes, for each of the at least one serving constraint, a plurality of points, each point including a cost per event value, and an event quantity value, and the points collectively defining a landscape; and d) using the received traffic estimate information to generate, using the computer system, offer information for at least one of the at least one ad serving constraint.

20. The computer-implemented method of claim 19 wherein at least one of the at least one serving constraint is a targeting keyword.

21. The computer-implemented method of claim 19 wherein at least one of the at least one serving constraint is a targeting concept.

22. The computer-implemented method of claim 19 wherein at least one of the at least one serving constraint is a targeting geolocation.

23. The computer-implemented method of claim 19 wherein the offer information includes at least one offer selected from a group of offers consisting of (A) an offer per impression, (B) an offer per selection, and (C) an offer per conversion.

24. The computer-implemented method of claim 19 wherein the offer information includes at least one offer selected from a group of offers consisting of (A) a maximum offer per impression, (B) a maximum offer per selection, and (C) a maximum offer per conversion.

25. Apparatus comprising:
a) at least one processor; and
b) at least one storage device storing instructions which, when executed by the at least one processor, perform a method including
　1) accepting an ad budget and at least one ad serving constraint, and
　2) generating offer information using the ad budget and the at least one serving constraint, wherein the act of generating offer information includes
　　i) obtaining, for each of the at least one ad serving constraint, a plurality of points, each point including
　　　A) a cost per event value, and
　　　B) an event quantity value, wherein the points collectively define a landscape,
　　ii) determining, for each of the at least one ad serving constraints, a convex landscape from the landscape, and
　　iii) using one or more points from at least one of the convex landscapes to generate the offer information.

* * * * *